United States Patent [19]

Wallace

[11] 3,778,916
[45] Dec. 18, 1973

[54] FISHING ROD

[76] Inventor: Maynard Wallace, 38172 Seaway Dr., Mt. Clemens, Mich. 48073

[22] Filed: Oct. 10, 1972

[21] Appl. No.: 295,894

[52] U.S. Cl. .............................................. 43/18 R
[51] Int. Cl. ............................................ A01k 87/00
[58] Field of Search ................ 43/18 R, 19.2, 18 G, 43/18 F, 20; 242/84.1, 220, 84.43

[56] References Cited
UNITED STATES PATENTS

| 2,772,505 | 12/1956 | Kaiser | 43/20 |
| 1,516,522 | 11/1924 | Farr | 43/18 R |
| 1,740,908 | 12/1929 | Schmedlen | 43/18 R |

Primary Examiner—Antonio F. Guida
Assistant Examiner—Gregory E. McNeill
Attorney—J. King Harness et al.

[57] ABSTRACT

A short fishing rod especially useful for ice or chug fishing, trolling, or children's use. the rod comprises an elongated handle portion and a rod portion mounted in a socket thereof. One end of the line is secured to the handle, which has a longitudinal groove around it for storing the line.

4 Claims, 5 Drawing Figures

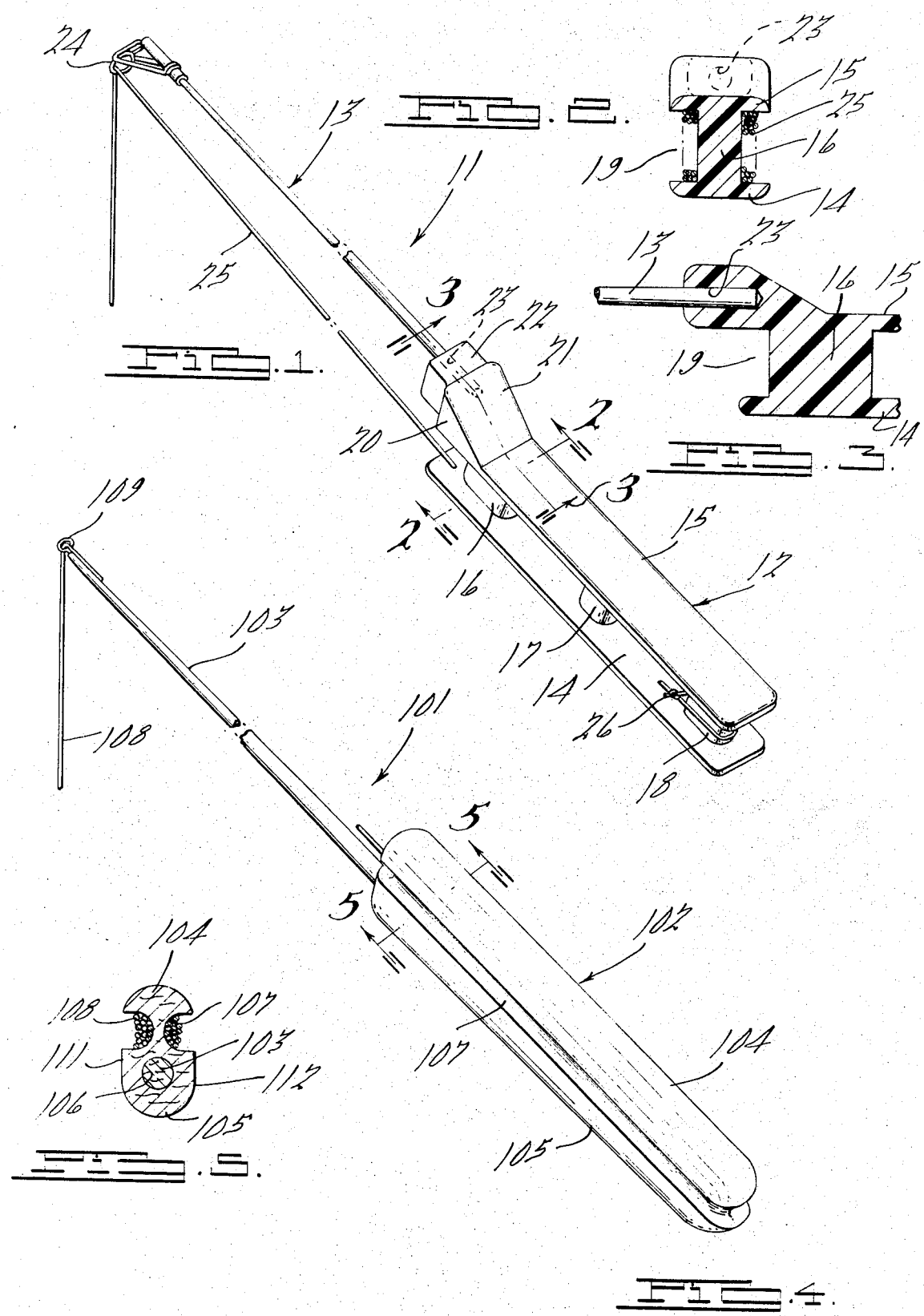

3,778,916

FISHING ROD

BACKGROUND AND BRIEF SUMMARY OF THE INVENTION

The invention relates to fishing rods and more particularly to relatively short rods such as are used in ice fishing, chug fishing or trolling, or for children's use.

It is an object of the invention to provide a novel and improved fishing rod of this type which is extremely simple to fabricate and in which the handle may be used to secure as well as store the line.

It is another object to provide an improved fishing rod of this nature which permits the line to be fed out or rewound in a quick and easy manner.

It is another object, in one form of the invention, to provide an improved fishing rod which is collapsible so as to be easily stored.

It is a further object to provide an improved fishing rod having these characteristics, which may be manufactured of various materials and with different styles.

Briefly, the invention comprises a fishing rod having an elongated handle portion with a socket at one end, and a rod portion mounted in the socket and extending therefrom. The rod portion is of relatively short length, so as to make the fishing rod usable in ice fishing, chug fishing, or trolling, or of a convenient length for children. The outer end of the rod has a line guide and the handle has a longitudinal groove around its periphery on which the line may be stored, with one end of the line secured to the groove portion of the handle.

In one embodiment, the handle is fabricated of a molded plastic material and has top and bottom bars connected by struts, the sockets being formed in an enlarged end of the top bar. In this embodiment, the groove comprises the space between the bars and defined by the struts, and the rod is removably mounted in the socket. In a second embodiment, the handle is of solid form, slightly tapered with rounded top and bottom and with a groove formed therein parallel to the top. The rod is permanently affixed in the socket.

BRIEF DESCRIPTION OF THE DRAWINGS

FIG. 1 is a perspective view of a first embodiment of the invention, parts being broken away.

FIG. 2 is a cross-sectional view of FIG. 1 taken along the line 2—2 thereof.

FIG. 3 is a fragmentary cross-sectional view of FIG. 1 taken along the line 3—3 thereof.

FIG. 4 is a perspective view of a second embodiment of the invention, and

FIG. 5 is a cross-sectional view of FIG. 4 taken along the line 5—5 thereof.

DESCRIPTION OF THE PREFERRED EMBODIMENTS

Referring first to the embodiment of FIGS. 1 to 3, the fishing rod is generally indicated at 11 and comprises a handle portion generally indicated at 12 and a rod portion generally indicated at 13. Handle portion 12 is shown as being fabricated of a molded plastic material which, for decorative purposes, may be transparent or colored. Handle 12 is of sufficient length to be grasped by the user and comprises bottom and top bars 14 and 15 of flat shape, connected by a plurality of struts 16, 17 and 18. The cross-sectional shapes of the bars and struts are seen best in FIG. 2, it being noted that the bars have rounded exposed edges and the struts are considerably narrower than the bars. If desired, the central strut 17 may be omitted. Bars 14 and 15, together with the struts, define a longitudinal groove 19 which extends entirely around the periphery of handle portion 12.

An enlargement 20 is formed at one end of top bar 15, this enlargement having an inclined outer surface 21 and an extension 22 within which is formed a socket 23 for rod portion 13.

The rod portion is formed of a material having the desired amount of strength and flexibility and may slip snugly into socket 23. A guide for line 25 is secured to the outer end of rod 13. Typically, and only by way of example, this rod may be anywhere from 8 inches to 20 inches long with handle 12 approximately 6 inches long. In use, one end 26 of line 25 may be secured to one of the struts, such as strut 18, and the remainder of line 25 wound around groove 19. The storage of line 25 is shown in FIG. 2. Rod 13 may be assembled in socket 23 with line 25 being fed through guide 24.

During fishing, the user will grasp handle 12 with top bar 15 uppermost in such manner that his thumb rests on the inclined surface 21 of enlargement 20. If it is desired to wind or unwind line 25 on handle 12, the handle may be turned around in the fisherman's hand so that he grasps only top bar 15, his thumb and forefinger grasping the opposite sides of enlargement 20. In this manner, the groove between the bars is exposed for winding or unwinding. It should be noted that the depth of the groove formed by bars 14 and 15 is sufficient that the line may be wound and stored therein without interfering with the grasp of handle 12 during fishing. Often, with the type of fishing for which the invention is intended, the user will put aside the fishing rod and hold line 25 outwardly thereof when he gets a bite. In this case, handle 12 will retain the unused line.

When fishing is ended, line 25 may be completely stored by winding it onto handle 12 and the fishing rod collapsed by removing rod portion 13 from socket 23.

FIGS. 4 and 5 show a second embodiment of the invention in which the handle has a somewhat different shape. The fishing rod is generally indicated at 101 and has a handle portion generally indicated at 102 and a rod 103. Handle 102 is shown as fabricated of wood, with an elongated shape and rounded top and bottom portions 104 and 105 respectively. The outer end of handle 102 has a socket 106 in which rod 103 is secured, and is somewhat wider than the other end for convenience in grasping.

A continuous longitudinal groove 107 is formed around the periphery of handle 102. The groove has a rounded cross-sectional shape as seen in FIG. 5 and is parallel to and adjacent top 104. A line 108 is secured at one end around groove 107 and is wound in the groove, thus being recessed within the outer surface of handle 102 as seen in FIG. 5. The line runs out along rod 103 and through a guide in the form of an eye 109 secured to the outer end of the rod.

In use, the fisherman will grasp handle 102 in the position shown in FIG. 4. If it is desired to store or remove a section of line 108 from groove 107, the handle may be turned around in the user's hand so that the side portions 111 and 112 adjacent bottom 105 are grasped between his thumb and forefinger. This will expose groove 107 so that the line may be wound or unwound therefrom. As described above, the fisherman getting a bite will often simply drop the fishing rod 101 and grasp line 108 outwardly therefrom, in which case the stored portion of line 108 will remain in the groove.

I claim:

1. In a short fishing rod for use in ice fishing or the like, an elongated handle portion having a back and a front shaped so as to be grasped securely by the fisherman with a portion at the front extending outwardly from his hand, said handle having a top and a bottom when so grasped, a rod portion mounted on and extending outwardly from said outwardly extending portion of the handle, a continuous elongated groove formed longitudinally from front to back around the entire extent of the handle between said top and bottom, said groove being of sufficient depth to permit one end of a fishing line to be secured in the groove and the line wound and stored in the groove without interfering with the fisherman's grasp of the handle, side surfaces on the end of said handle adjacent the rod which may be grasped between the thumb and forefinger so as to expose said groove and permit the line to be wound or unwound therefrom, and a guide for said line at the outer end of said rod.

2. The combination according to claim 1, said handle comprising top and bottom bars and struts extending therebetween.

3. The combination according to claim 2, said outwardly extending portion of the handle being enlarged and having an inclined surface for supporting the thumb of the fisherman, said side surfaces to be grasped between the thumb and forefinger when winding or unwinding the line being formed on the opposite sides of said enlargement.

4. The combination according to claim 1, said handle having a rounded top and bottom and being tapered with the wider end of the handle being adjacent said rod portion, said groove being parallel to the top of said handle, said surfaces to be grasped by the thumb and forefinger when winding or unwinding the line being formed at the outer end of said handle adjacent the bottom thereof.

* * * * *